United States Patent
Kobori

(10) Patent No.: US 10,466,390 B2
(45) Date of Patent: Nov. 5, 2019

(54) SILICA FILM, OPTICAL MEMBER, AND POLARIZING MEMBER

(71) Applicant: SAMSUNG ELECTRONICS CO., LTD., Suwon-si (KR)

(72) Inventor: Shigeto Kobori, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/322,508

(22) PCT Filed: Jun. 30, 2015

(86) PCT No.: PCT/KR2015/006736
§ 371 (c)(1),
(2) Date: Dec. 28, 2016

(87) PCT Pub. No.: WO2016/003175
PCT Pub. Date: Jan. 7, 2016

(65) Prior Publication Data
US 2017/0123108 A1 May 4, 2017

(30) Foreign Application Priority Data

Jun. 30, 2014 (JP) .................. 2014-135339
Oct. 29, 2014 (JP) .................. 2014-220831
Jun. 12, 2015 (JP) .................. 2015-119477

(51) Int. Cl.
*G02B 1/111* (2015.01)
*G02B 1/18* (2015.01)
(Continued)

(52) U.S. Cl.
CPC .............. *G02B 1/111* (2013.01); *G02B 1/113* (2013.01); *G02B 1/14* (2015.01); *G02B 1/18* (2015.01);
(Continued)

(58) Field of Classification Search
CPC .. G02B 1/111; G02B 1/14; G02B 1/18; G02B 1/115; G02B 5/3025; G02B 5/30;
(Continued)

(56) References Cited

U.S. PATENT DOCUMENTS 6,251,523 B1* 6/2001 Takahashi ......... B32B 17/10036
428/428
7,037,573 B2 5/2006 Miyatake et al.
(Continued)

FOREIGN PATENT DOCUMENTS

CN 102152559 A 8/2011
CN 102985499 A 3/2013
(Continued)

OTHER PUBLICATIONS

English translation of KR 10-2007-0118029, machine translated on Apr. 24, 2018.*
(Continued)

Primary Examiner — Jie Lei
(74) Attorney, Agent, or Firm — Sughrue Mion, PLLC

(57) ABSTRACT

Provided is a silica film, etc. not having the film strength thereof being easily degraded, even when hollow silica particles are contained therein. Further, provided is a silica film, etc. having a lower reflectivity. A silica layer (the silica film) comprises silica and fluorinated hollow silica particles. The silica is formed by converting polysilazane into silica. The fluorinated hollow silica particles are locally distributed on the surface of the silica layer. The part where the fluorinated hollow silica particles are localized has the function of a low refractive index layer, and the parts other than the part where the fluorinated hollow silica particles are localized have the function of a hard coat layer.

20 Claims, 13 Drawing Sheets

(51) Int. Cl.
  *G02B 1/14* (2015.01)
  *G02B 5/30* (2006.01)
  *G02F 1/1335* (2006.01)
  *G02B 1/113* (2015.01)

(52) U.S. Cl.
  CPC ..... *G02B 5/3025* (2013.01); *G02F 1/133502* (2013.01)

(58) Field of Classification Search
  CPC ...... G02B 5/0278; G02B 5/128; G02B 1/113; G02F 1/133502; G02F 1/1335; G02F 1/133504; H04N 5/65; G11B 5/708
  USPC ........ 359/601, 609, 580, 586, 582; 428/149, 428/323, 206, 446, 447; 349/112, 137
  See application file for complete search history.

(56) References Cited

U.S. PATENT DOCUMENTS

| | | | |
|---|---|---|---|
| 8,007,878 | B2 | 8/2011 | Yoneyama et al. |
| 9,127,171 | B2 | 9/2015 | Kim et al. |
| 2007/0047087 | A1 | 3/2007 | Fukuda et al. |
| 2009/0147196 | A1 | 6/2009 | Horie et al. |
| 2011/0317263 | A1 | 12/2011 | Yoneyama et al. |
| 2013/0078440 | A1 | 3/2013 | Kim et al. |
| 2014/0322486 | A1 | 10/2014 | Kobori |

FOREIGN PATENT DOCUMENTS

| | | | | |
|---|---|---|---|---|
| EP | 0 974 560 | B1 | 2/2013 | |
| JP | 11-292568 | A | 10/1999 | |
| JP | 2001-316604 | A | 11/2001 | |
| JP | 2004109966 | A | 4/2004 | |
| JP | 2006-79068 | A | 3/2006 | |
| JP | 2006-82341 | A | 3/2006 | |
| JP | 2006-259096 | A | 9/2006 | |
| JP | 2007-86764 | A | 4/2007 | |
| JP | 2008-15500 | A | 1/2008 | |
| JP | 2008-015527 | * | 1/2008 | ............... G02B 5/02 |
| JP | 2009-128488 | A | 6/2009 | |
| JP | 2012-42911 | A | 3/2012 | |
| JP | 5505474 | B2 | 5/2014 | |
| KR | 1020070017040 | A | 2/2007 | |
| KR | 1020070118029 | A | 12/2007 | |
| KR | 1020100127954 | A | 12/2010 | |
| KR | 1020120067196 | A | 6/2012 | |
| KR | 101173451 | B1 | 8/2012 | |
| TW | 200809279 | A | 2/2008 | |
| TW | I394977 | B | 5/2013 | |

OTHER PUBLICATIONS

English translation of JP 2008-015527, machine translated, Apr. 3, 2019.*
Communication dated Jan. 2, 2018, issued by the State Intellectual Property Office of the People's Republic of China in counterpart Chinese Patent Application No. 201580036067.3.
Communication dated Feb. 21, 2018, issued by the European Patent Office in counterpart European Patent Application No. 15814386.7.
Communication dated Sep. 22, 2015, issued by the International Searching Authority in counterpart International Application No. PCT/KR2015/0006736 (PCT/ISA/210 & PCT/ISA/237).
Communication dated Sep. 6, 2018, issued by the European Patent Office in counterpart European Application No. 15814386.7.
Communication dated Sep. 17, 2018, issued by the State Intellectual Property Office of P.R. China in counterpart Chinese Application No. 201580036067.3.
Communication dated Mar. 26, 2019 issued by the Japanese Patent Office in counterpart Japanese Patent Application No. 2015-119477.
Office Action dated Apr. 12, 2019 issued by the European Patent Office in counterpart European Patent Application No. 15814386.7.

* cited by examiner

FIG. 12

| | COMPOSITION | | | | | COMPOSITION | | | |
|---|---|---|---|---|---|---|---|---|---|
| | FLUORINATED HOLLOW SILICA PARTICLE (wt%) | | REACTIVE SILICON (wt%) | POLYSILAZANE (wt%) | 3690cm⁻¹ SURFACE AREA STRENGTH | MinR (%) | Y-VALUE (%) | SW SCRATCH TEST (g) | PENCIL HARDNESS |
| | 60nm | 50nm | | | | | | | |
| EXAMPLE B1 | 5 | 3 | 0 | 92 | 0.375 | 0.16 | 0.23 | 150 | 2H |
| EXAMPLE B2 | 4 | 3 | 0 | 93 | 0.367 | 0.18 | 0.25 | 150 | 2H |
| EXAMPLE B3 | 3 | 3 | 0 | 94 | 0.384 | 0.21 | 0.27 | 200 | 2H |
| EXAMPLE B4 | 12 | 3 | 1 | 84 | 0.413 | 0.11 | 0.17 | 250 | 3H |
| EXAMPLE B5 | 15 | 0 | 3 | 82 | 0.436 | 0.13 | 0.19 | 250 | 3H |
| COMPARATIVE EXAMPLE B1 | 8 | 0 | 0 | 92 | 0.393 | 0.18 | 0.24 | 50NG | H |
| COMPARATIVE EXAMPLE B2 | 7 | 0 | 0 | 93 | 0.399 | 0.18 | 0.26 | 50NG | H |
| COMPARATIVE EXAMPLE B3 | 6 | 0 | 0 | 94 | 0.387 | 0.21 | 0.29 | 50 | H |
| COMPARATIVE EXAMPLE B4 | 15 | 0 | 0 | 85 | 0.429 | 0.11 | 0.17 | 50NG | F |
| COMPARATIVE EXAMPLE B5 | 15 | 0 | 4 | 81 | 0.457 | 0.13 | 0.19 | HAZE NG | – |

FIG. 13

|  |  | EXAMPLE C1 | COMPARATIVE EXAMPLE C1 |
|---|---|---|---|
| OPTICAL PROPERTY | Y-VALUE (%) | 0.36 | 3.93 |
| | MinR (%) | 0.28 | 3.83 |
| | COLOR (a*, b*) | 3.9, −3.2 | 0.0, −0.5 |
| POLARIZING PLATE PERFORMANCE | LIGHT TRANSMITTANCE (%) | 43.9 | 42.5 |
| | DEGREE OF POLARIZATION (%) | 99.996 | 99.995 |

SILICA FILM, OPTICAL MEMBER, AND POLARIZING MEMBER

TECHNICAL FIELD

The present disclosure relates to a silica film, and more particularly, to a silica film arranged on a surface of a display unit of a display apparatus.

BACKGROUND ART

For example, a display device including a liquid crystal panel may have a polarizing film at an outermost surface. A surface of the polarizing film may be, for example, formed of a triacetylcellulose (TAC) film. However, since the TAC is susceptible to being scratched, a hard coat layer may be arranged on the TAC so as to prevent the TAC from being scratched. Also, a low refractive index layer for suppressing reflection of light incident from the outside may be equipped on the hard coat layer. Here, in order to decrease the reflectance, the low-refractive index layer may include hollow silica particles in a binder formed of a resin as a base material.

Patent Document 1 discloses an anti-reflection film. The anti-reflection film is directly formed on at least one surface of a transparent substrate film or with another layer therebetween, thereby forming an anti-reflection layer. The anti-reflection layer satisfies a refractive index: $ND^{20} \leq 1.49$ and is formed of at least two low refractive index materials.

Also, Patent Document 2 discloses a curable resin composition. A multifunctional silane compound including a multifunctional (meth)acrylate is chemically bonded to a surface hydroxyl group of silica fine particles. An organic-inorganic hybrid hard coating solution including the organic-inorganic silica particles and an antistatic coating solution are mixed. The antistatic coating solution includes conductive metal oxide fine particles having a multifunctional (meth)acrylate chemically bonded to a surface thereof. Also, due to a self-organizing property of the two coating solutions, an antistatic property and an anti-glare property may both be realized in a single layer. Further, a phase-stabilizing agent is added to the antistatic anti-glare coating solution to control the self-organizing property of the antistatic anti-glare layer. Also, the surface roughness of the layer are controlled to a nano size which leads to lowering the refractive index, and thus, a low-reflection function may be imparted to the layer.

PRIOR ART DOCUMENT

Patent Document 1: JP 2004-109966A
Patent Document 2: JP 2008-015527A

DETAILED DESCRIPTION OF THE INVENTION

Technical Problem

However, when hollow silica particles are contained in a low-refractive index layer, the hollow silica particles may lower a cross-linking density of a binder. Thereby, the strength of the low-refractive index layer may deteriorate. Also, a conventional low-refractive index layer has a reflectance that is not sufficiently low. Therefore, in the present disclosure, provided is a silica film with a strength that does not easily deteriorate even when the hollow silica particles are used. Also, provided is the silica film having a lower reflectance.

Technical Solution

According to an aspect of an embodiment, an optical element includes a substrate; and a silica film disposed on the substrate, wherein the silica film has a first surface and a second surface, the first and second surfaces being opposite to each other, the silica film includes silica and fluorinated hollow silica particles, the fluorinated hollow silica particles are unevenly distributed with a greater concentration toward the first surface, and the first surface of the silica film has a convex-concave structure.

The silica film may further include a reactive silicon compound.

A region of the silica film where the fluorinated hollow silica particles are concentrated may be a low-refractive index layer, and a region other than the region where the fluorinated hollow silica particles are concentrated may be a hard coat layer.

The fluorinated hollow silica particles may be hollow silica particles having a fluorine functional group that is introduced to a part of hydroxyl groups existing on a surface of the hollow silica particles.

The fluorinated functional group may include at least one selected from a (per)fluoro alkyl group and a (per)fluoro polyether group.

The fluorinated hollow silica particles may have a plurality of relative maximum points in a frequency-particle diameter curve which exhibits particle distribution of the fluorinated hollow silica particles.

An integrated intensity at 3690 $cm^{-1}$ of the fluorinated hollow silica particles may be 0.5 or lower.

An arithmetic mean roughness (Ra) of the first surface may be 10 nm or higher.

The substrate may be a polarizing means for polarizing light.

The silica film may be formed from a coating solution for forming a silica film, the coating solution including a polysilazane or a mixture of a polysilazane and a reactive silicon compound; fluorinated hollow silica particles; and a solvent that disperses the polysilazane and the fluorinated hollow silica particles.

A weight ratio of the polysilazane and the fluorinated hollow silica particles may be in a range of about 94:6 to about 98:2.

The solvent may be a hydrophobic and non-polar organic solvent.

According to another aspect of an embodiment, a display device includes a display means on which an image is displayed; and an optical element disposed on a surface of the display means, wherein the optical element is the optical element.

Advantageous Effects of the Invention

According to one or more embodiments, provided is a silica film having strength that does not easily deteriorate even when hollow silica particles are contained therein. Also, provided is the silica film having low reflectivity.

DESCRIPTION OF THE DRAWINGS

FIG. 12 is a view that illustrates Examples and Comparative Examples; and

FIG. 13 is a view that illustrates the results of evaluating a polarizing film.

BEST MODE

Figure 1A:
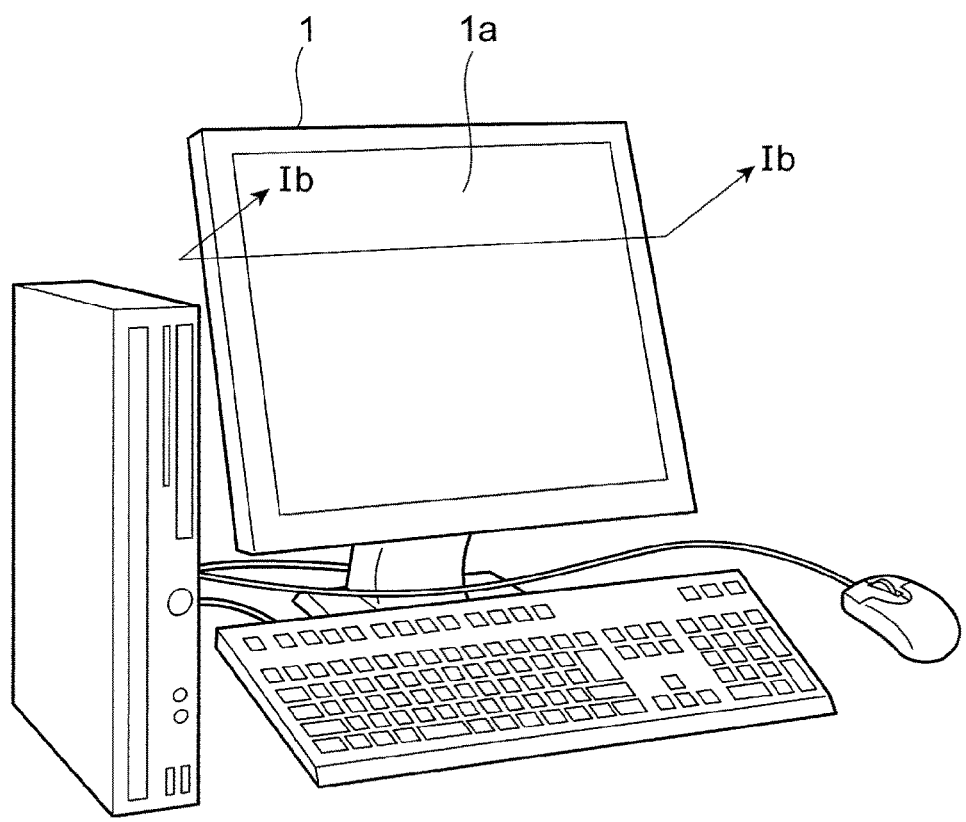
FIG. 1A is a view that illustrates an example of a display device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

<Description of Display Apparatus>

FIG. 1A is a view that illustrates a display apparatus 1 according to an embodiment.

Non-limiting examples of the display apparatus 1 may include display apparatuses such as a liquid crystal display (LCD), a plasma display panel (PDP), a cathode ray tube (CRT) display, and an electroluminescent (EL) display. Also, non-limiting examples of the display apparatus 1 may include large-sized display apparatuses such as TV, a monitor, and a billboard. In addition, non-limiting examples of the display apparatus 1 may include small-sized display apparatuses for a mobile device such as a navigator for vehicles, a portable game device, or a mobile phone. The display apparatus 1 displays an image on a display screen 1a.

<Description of Liquid Crystal Panel>

Figure 1B:
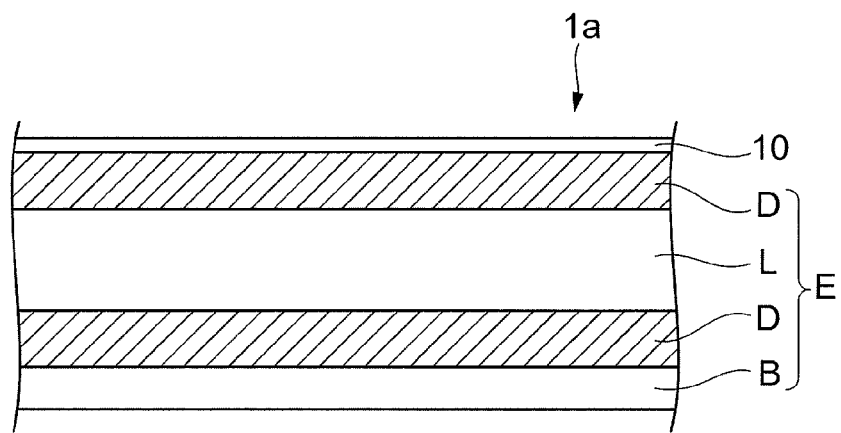
FIG. 1B is a cross-sectional view, taken along line Ib-Ib of FIG. 1A, which exhibits an example of a structure of a display screen according to an embodiment.

FIG. 1B is a cross-sectional view, taken along line Ib-Ib of FIG. 1A, which illustrates an example of a structure of a display screen 1a according to an embodiment.

The display screen 1a includes a liquid crystal panel E, which is an example of a display means, and a silica layer (or a silica film) 13 formed on a surface of the liquid crystal panel E.

As shown in the drawing, the liquid crystal panel E includes a liquid crystal L, polarizing films D disposed on an upper surface and a lower surface of the liquid crystal L; and a backlight B disposed on a lower side of the polarizing film D which is on the lower surface of the liquid crystal L.

The polarizing films D on the upper and lower surfaces of the liquid crystal L are examples of a polarizing means that polarizes light, and directions of light being polarized by the polarizing films D may be perpendicular to each other. For example, the polarizing films D may have a resin film including iodine compound molecules in a polyvinyl alcohol (PVA). Also, the resin film is inserted between, and is bonded to, two resin films formed of triacetylcellulose (TAC). Light is polarized by the iodine compound molecules included in the polarizing films D. Also, the backlight B may be, for example, a cold cathode fluorescent lamp or a white light-emitting diode (LED).

A power source not shown in the drawings is connected to the liquid crystal L, and when a voltage is applied by the power source, an arrangement direction of the liquid crystal L changes. Also, when light is irradiated from the backlight B, light is first transmitted through the polarizing film D on the lower surface of the liquid crystal L, and thus light is polarized. When the liquid crystal panel E is a TN-type liquid crystal panel, the polarized light is transmitted through the liquid crystal panel E as it is while the voltage is applied to the liquid crystal panel E. Also, the polarizing film D on the upper surface has a different polarizing direction and thus blocks the polarized light. A polarizing direction of the polarized light rotates 90° according to a function of the liquid crystal panel E when a voltage is not applied to the liquid crystal panel E. In this regard, the polarizing film D on the upper surface does not block the polarized light and transmits the polarized light. Thus, an image may be displayed according to whether a voltage is applied to the liquid crystal panel E or not. Also, although not shown, a color image may be displayed by using a color filter. Here, the polarizing film D forming the silica layer 13 is an example of a polarizing element.

Figure 1C:
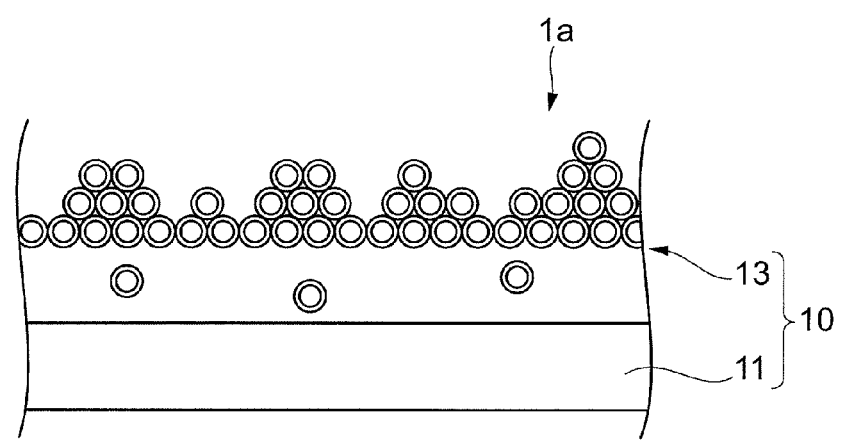
FIG. 1C is an enlarged view of FIG. 1B, the enlarged view showing the outermost part of the display screen.

FIG. 1C is an enlarged view of FIG. 1B and illustrates the outermost part of the display screen 1a.

Here, the substrate 11 and the silica layer 13 are shown. The substrate 11 is the outermost layer of the polarizing film D. Also, the substrate 11 and the silica layer 13 may be used alone as a protection film 10. When the substrate 11 and the silica layer 13 are used as the protection film 10, the protection film 10 protects the polarizing film D. Also, the protection film 10 is an example of an optical element according to an embodiment.

The substrate 11 may be a transparent substrate having a total luminous transmittance of 85% or higher. The substrate 11 may be, for example, TAC as described above. Also, embodiments are not limited thereto, and the substrate 11 may be polyethylene terephthalate (PET). However, according to an embodiment, the substrate 11 may be preferably TAC. The substrate 11 may have a thickness, for example, in a range of about 20 μm or greater to about 200 μm or less.

The silica layer 13 is a functional layer for preventing scratches on the polarizing film D that includes the substrate 11. Also, the functional layer suppresses reflection when external light is irradiated thereto.

Hereinafter, a structure of the silica layer 13 will be described.

Figure 2A:
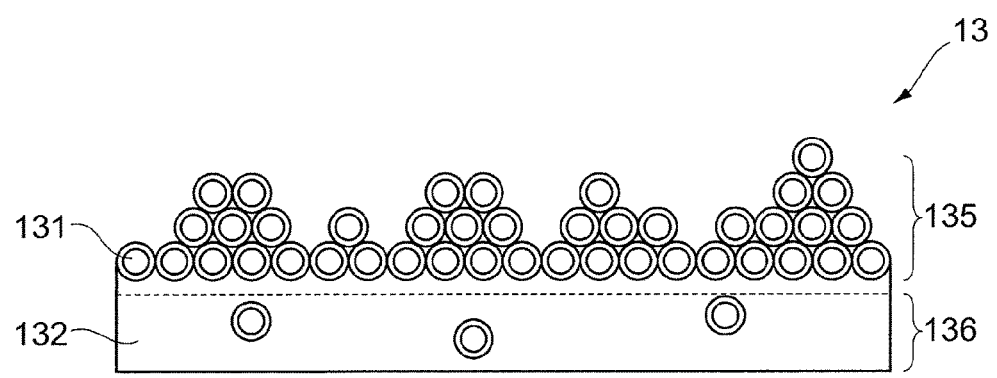
FIGS. 2A and 2B are views that illustrate a silica layer in further detail.
Figure 2B:
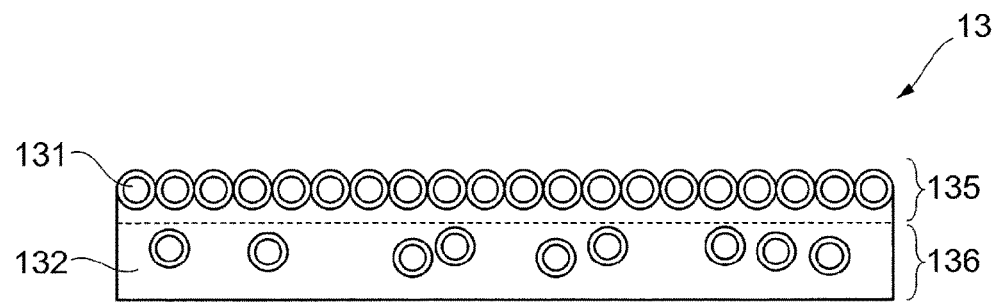

FIGS. 2A and 2B illustrate the silica layer 13 in detail.

The silica layer 13 has a first surface (an upper surface in the drawing) and a second surface (a lower surface in the drawing). The silica layer 13 includes fluorinated hollow silica particles 131 and silica 132. Also, the fluorinated hollow silica particles 131 are distributed in the silica 132. Also, the fluorinated hollow silica particles 131 are unevenly distributed with a greater concentration at a first surface portion of the silica layer 13. Thereby, as will be described later, the silica layer 13 has a low-refractive index layer 135 at the first surface portion. The fluorinated hollow silica particles 131 being more concentrated at the first surface portion of the silica layer 13 indicates that an amount of the fluorinated hollow silica particles 131 at the first surface portion is higher than an amount of the fluorinated hollow silica particles 131 at a second surface portion. Also, almost none of the fluorinated hollow silica particles 131 may exist on a surface portion of the silica layer 13 which faces with the substrate 11, and the silica 132 may occupy most of the surface portion of the silica layer 13 which faces with the substrate 11. Thereby, as will be described in detail later, the surface portion of the silica layer 13 which faces with the substrate 11 forms a hard coat layer 136.

In FIGS. 2A and 2B, an interface of the low-refractive index layer 135 and the hard coat layer 136 is shown as a broken line. In FIG. 2A, the fluorinated hollow silica particles 131 are agglomerated on a surface side of the silica layer 13. In this regard, the silica layer 13 may have a sea-island structure (a concave-convex structure) on a surface thereof. FIG. 2B shows that the fluorinated hollow silica particles 131 are not agglomerated and do not form a sea-island structure. As will be described in detail later, a mixing ratio (wt %) of the fluorinated hollow silica particles 131 and a fluorine compound may be controlled to form the silica layer 13 in one of the two forms set forth above.

The silica 132 is formed by converting a perhydropolysilazane (hereinafter, also referred to as a "polysilazane") to silica. As will be described in detail later, the silica layer 13 is prepared as follows. A coating solution is prepared by mixing a polysilazane solution and the fluorinated hollow silica particles 131. Then, the coating solution is coated on the substrate 11 as a coating layer, the coating layer is dried, and the polysilazane is converted to silica to prepare the silica layer 13.

A polysilazane is an inorganic polymer that has —(SiH$_2$NH)— as a basic unit and dissolves in an organic solvent. A polysilazane is hydrolyzed and thus converted to silica to obtain a high-strength silica layer 13 having strength close to that of glass. The hydrolysis reaction (e.g., conversion to silica) of a polysilazane is represented as follows.

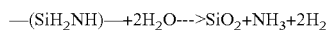

—(SiH$_2$NH)—+2H$_2$O--->SiO$_2$+NH$_3$+2H$_2$

A surface tension of a polysilazane is preferably higher than a surface tension of the fluorinated hollow silica particles 131. When the surface tension of a polysilazane is higher than a surface tension of the fluorinated hollow silica particles 131, the fluorinated hollow silica particles 131 in the coating layer bleed out to a surface of the coating layer. In this regard, the fluorinated hollow silica particles 131 may be more concentrated in a surface portion of the coating layer. A difference between a surface tension of a polysilazane and a surface tension of the fluorinated hollow silica particles 131 may be preferably about 10 N/m or higher, or, more preferably, about 15 N/m or higher.

Also, when a surface tension of a polysilazane is higher than a surface tension of the fluorinated hollow silica particles 131, the fluorinated hollow silica particles 131 may spontaneously bleed out to the surface of the coating layer. As a result, the fluorinated hollow silica particles 131 may be unevenly distributed with a greater concentration toward a surface of the silica layer 13. In this regard, the silica layer 13 having the fluorinated hollow silica particles 131 more concentrated in the surface portion may be manufactured only by coating one layer of the coating layer. As great a difference as possible between the surface tension of a polysilazane and the surface tension of the fluorinated hollow silica particles 131 is preferable. The greater the difference between the two surface tensions, the easier the fluorinated hollow silica particles 131 may bleed out to a surface of the coating layer.

When the fluorinated hollow silica particles 131 are contained in the silica layer 13, a region in which the fluorinated hollow silica particles 131 are contained may have a low refractive index. In this regard, reflection of external light may be suppressed. According to an embodiment, the fluorinated hollow silica particles 131 are unevenly distributed with a greater concentration toward a surface of the silica layer 13. In this regard, the surface portion of the silica layer 13 becomes the low-refractive index layer 135. A refractive index of the low-refractive index layer 135 may be, for example, about 1.50 or lower.

Also, in this regard, a side of the silica layer 13 which faces with the substrate 11 is mostly formed of the silica 132. Therefore, a side of the silica layer 13 which faces with the substrate 11 has high strength and becomes the hard coat layer 136.

The fluorinated hollow silica particles 131 are formed by fluorinating a surface of hollow silica particles.

Figure 3A:
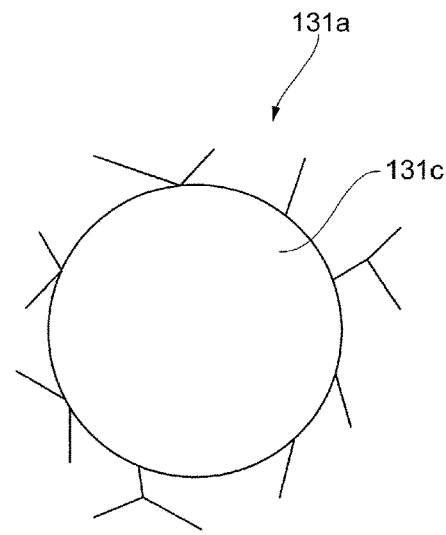
FIGS. 3A and 3B are schematic views that illustrate a structure of hollow silica particles.
Figure 3B:
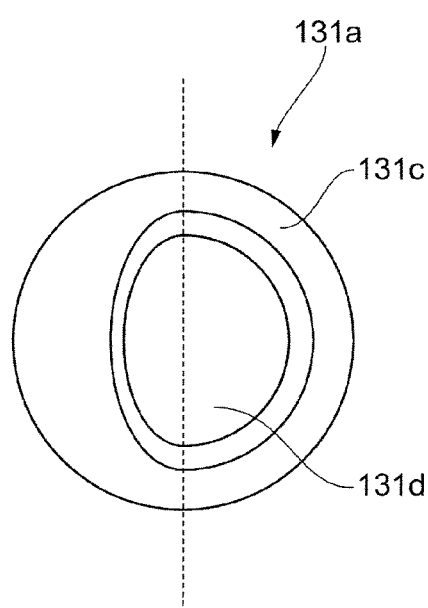

FIGS. 3A and 3B are schematic views that illustrate a structure of a hollow silica particle 131a.

As shown in FIG. 3A, the hollow silica particle 131a includes a core 131c composed of silicon and an inorganic compound other than silicon. Also, an acryloyl group and/or a methacryloyl group may be bound to a surface of the core 131c by a Si—O—Si bond and/or a hydrogen bond. In this regard, pluralities of acryloyl groups, methacryloyl groups, and/or hydroxyl groups may exist on the surface of the hollow silica particle 131a. As shown in FIG. 3B, an inside of the core 131c of the hollow silica particle 131a includes an air layer 131d. Due to having this structure, a refractive index of the hollow silica particle 131a decreases.

In general, a plurality of hydroxyl groups are bound to a surface of an outermost layer of the hollow silica particle 131a. Here, a polysilazane is highly reactive and thus is hydrolyzed by reacting with a hydroxyl group. In this regard, a hollow silica particle 131a having a plurality of hydroxyl groups on a surface thereof is added to a polysilazane solution, and the hydroxyl groups react with the polysilazane. That is, the hydroxyl groups existing on the surface of the hollow silica particle 131a react with the polysilazane before the polysilazane is converted to silica. Also, when the hydrolysis of a polysilazane is started, the solution becomes cloudy. Also, reactive sites of a polysilazane that have reacted with the hydroxyl groups do not cross-link with a peripheral silica backbone during conversion of a polysilazane to silica. In this regard, the strength of the silica layer 13 degrades.

Thus, according to an embodiment, the hollow silica particle 131a is fluorinated to suppress reaction between the hollow silica particle 131a and a polysilazane. That is, the hollow silica particle 131a is converted into the fluorinated hollow silica particles 131. In particular, a fluorine functional group having low reactivity with a polysilazane is partially introduced to the hydroxyl group on the surface of the hollow silica particle 131a. Examples of the fluorine functional group may include a (per)fluoro alkyl group and a (per)fluoropolyether group.

A structure of the (per)fluoro alkyl group is not particularly limited. The (per)fluoro alkyl group may be, for example, linear (e.g., —$CF_2CF_3$, —$CH_2(CF_2)_4H$, —$CH_2(CF_2)_8CF_3$, or —$CH_2CH_2(CF_2)_4H$). Also, the (per)fluoro alkyl group may have, for example, a branched structure (e.g., $CH(CF_3)_2$, $CH_2CF(CF_3)_2$, $CH(CH_3)CF_2CF_3$, or $CH(CH_3)(CF_2)_5CF_2H$). Also, the (per)fluoro alkyl group may have, for example, a cyclic structure. The cyclic structure may be, for example, 5-membered or 6-membered. Also, the cyclic structure may include a perfluoro cyclohexyl group, a perfluoro cyclopentyl group, or an alkyl group substituted with a cyclic group selected therefrom.

The (per)fluoro polyether group is a (per)fluoro alkyl group having an ether bond, and the structure is not particularly limited. That is, the (per)fluoro polyether group may be, for example, —$CH_2OCH_2CF_2CF_3$ or —$CH_2CH_2OCH_2C_4F_8H$. Also, the (per)fluoro polyether group may be, for example, —$CH_2CH_2OCH_2CH_2C_8F_{17}$ or —$CH_2CH_2OCF_2CF_2OCF_2CF_2H$. Also, the (per)fluoro polyether group may be a C4-C20 fluorocycloalkyl group having at least 5 fluorine atoms. Also, the (per)fluoro polyether group may be, for example, —$(CF_2)_XO(CF_2CF_2O)_Y$—, —$[CF(CF_3)CF_2O]_X$—$CF_2(CF_3)$]—, —$(CF_2CF_2CF_2O)_X$—, or —$(CF_2CF_2O)_X$—. Here, each of X and Y is a natural number.

A median particle diameter ($D_{50}$) of the fluorinated hollow silica particle 131 may be preferably in a range of about 10 nm or greater to about 100 nm or less. More preferably, the median particle diameter ($D_{50}$) of the fluorinated hollow silica particle 131 may be preferably in a range of about 40 nm or greater to about 60 nm or less. When the median particle diameter ($D_{50}$) of the fluorinated hollow silica particle 131 is less than about 10 nm, an effect of decreasing the refractive index of the low-refractive index layer 135 may not occur. Also, when the median particle diameter ($D_{50}$) of the fluorinated hollow silica particle 131 is greater than about 100 nm, transparency of the low-refractive index layer 135 may degrade.

A median particle diameter of the fluorinated hollow silica particles 131 is a median value of particle diameters of the fluorinated hollow silica particles 131. When the fluorinated hollow silica particles 131 are assumed to have the shape of a sphere, the particle diameters are a diameter of a sphere. For example, a particle diameter of the fluorinated hollow silica particles 131 may be measured by using a laser diffraction/scattering particle size distribution analyzer. The laser diffraction/scattering particle size distribution analyzer may be, for example, LA-920 (available from Horiba, Ltd.). Also, a refractive index of the fluorinated hollow silica particles 131 changes according to a refractive index required for the low-refractive index layer 135. The refractive index of the fluorinated hollow silica particles 131 may be, for example, in a range of about 1.10 or higher to about 1.40 or lower, or, for example, preferably, in a range of about 1.15 or higher to about 1.25 or lower. For example, the refractive index of the fluorinated hollow silica particle 131 may be measured by using simulation software. Examples of the simulation software may include TracePro™ available from Lambda Research Optics. Inc.

<Description of Fluorination of Hollow Silica Particle>

Figure 4:
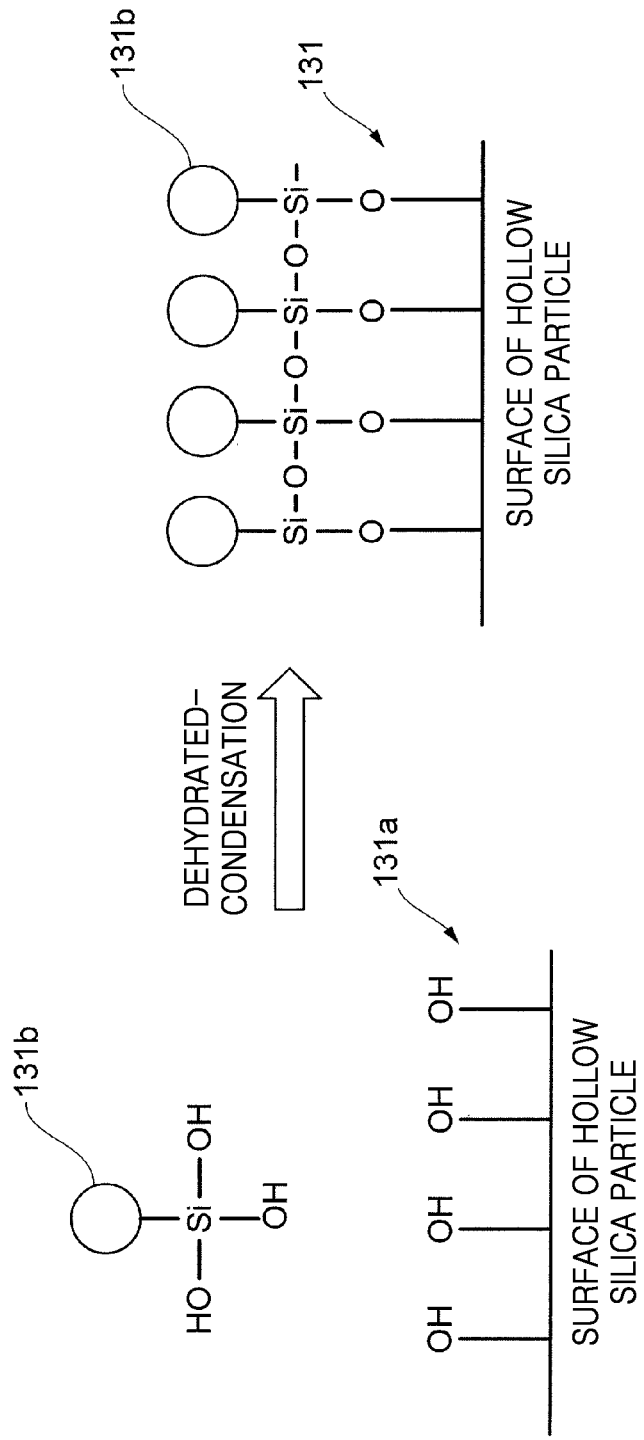
FIG. 4 is a view that illustrates a method of fluorinating hollow silica particles.
Figure 5:
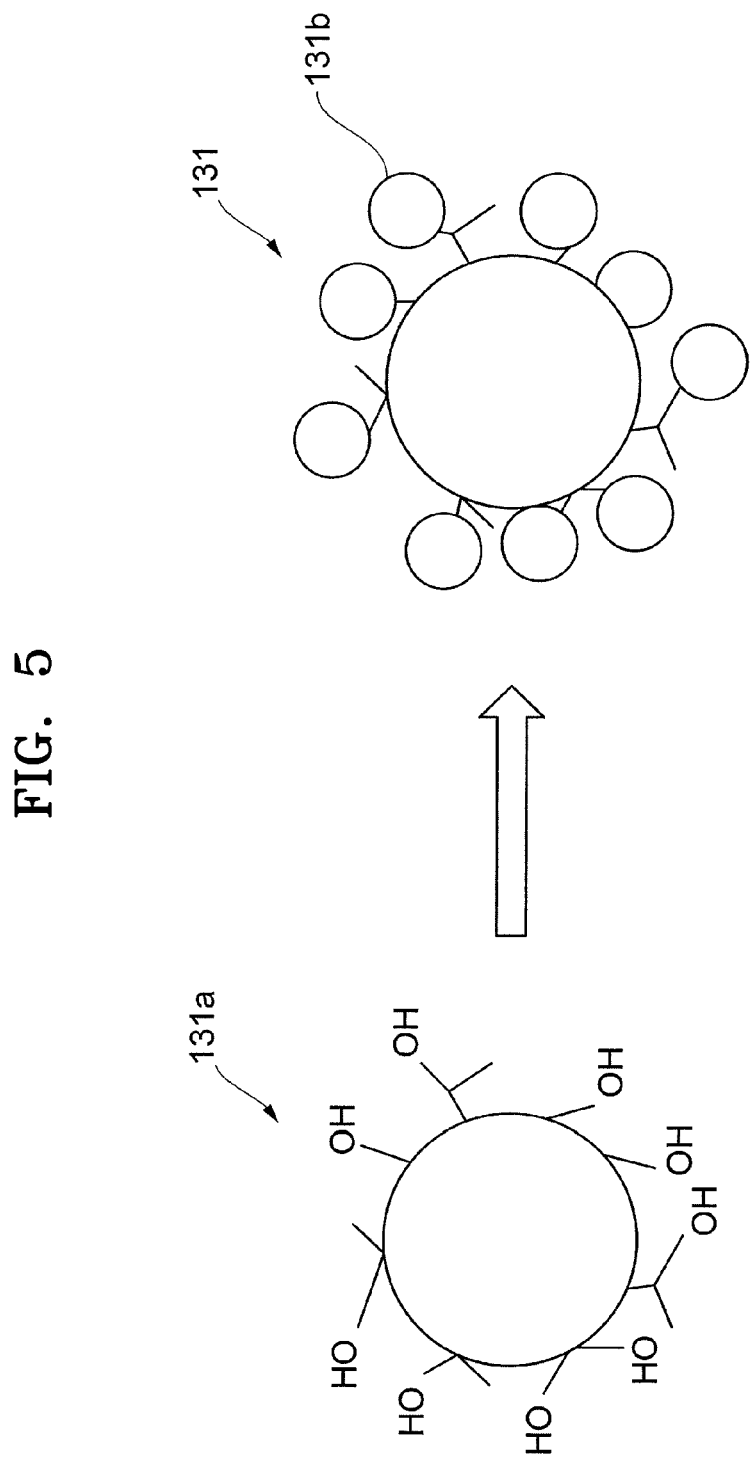
FIG. 5 is a view that illustrates a method of fluorinating hollow silica particles.

FIGS. 4 and 5 are views that illustrate a method of fluorinating the hollow silica particle 131a.

Also, the method of preparing the fluorinated hollow silica particle 131 described herein is an example, and embodiments are not limited thereto. Here, a fluorine compound, which is a compound having a fluorine functional group, is reacted with the hollow silica particles 131a. In this regard, the hollow silica particle 131a may be fluorinated by introducing a fluorine functional group to a surface of the hollow silica particle 131a. Also, Surulia 4320 (available from Nikki Shokubai Kasei Co., Ltd.) hollow silica particles may be used as the hollow silica particles. Also, perfluoropolyethersilane, such as KY-108 (available from Shin-Etsu Chemical Co., Ltd.), may be used as the fluorine compound. The KY-108 has a reactive silanol group.

First, the hollow silica particle 131a is dissolved in methylisobutyl ketone (MIBK) to prepare an about 10 wt % hollow silica particle solution. Then, a predetermined amount of KY-108 is added to the hollow silica particle solution, and then the solution is stirred at a temperature of about 50° C. for about 24 hours. Here, hydrochloric acid or acetic acid may be added as a catalyst. In this regard, as shown in FIG. 4, a hydroxyl group and a silanol group of KY-108 on the surface of the hollow silica particle 131a are dehydrated-condensed. Also, a covalent bond (a siloxane bond) is formed. In this regard, a fluorine functional group 131b may be introduced instead of the hydroxyl group at the surface of the hollow silica particle 131a. Also, as shown at a right side of FIG. 5, a fluorinated hollow silica particle 131 having low reactivity with a polysilazane may be prepared. A reaction temperature of about 70° C. or higher is not preferable as the hollow silica particles 131a agglomerate at such a temperature. Hereinafter, a process of introducing a fluorine functional group to a surface of the hollow silica particle 131a is referred to as surface treatment of the hollow silica particle 131a with fluorine. An amount of KY-108 added to a solution of the hollow silica particle 131a is determined by a desired proportion of a surface of the hollow silica particle 131a to be surface treated with fluorine.

A proportion of surface treatment with fluorine with respect to a surface of the hollow silica particle 131a is not particularly limited. When a proportion of surface treatment with fluorine is high, a difference between a surface tension of a polysilazane and a surface tension of the fluorinated hollow silica particles 131 increases. As a result, the fluorinated hollow silica particles 131 agglomerate with each other on a surface of the coating layer, and a fine sea-island structure is formed. Provided that the sea-island structure is formed on the surface of the coating layer, after conversion of a polysilazane to silica, convex-concave shapes are formed on a surface of the silica layer 13. Also, an air layer is formed on a surface of the silica 132. In this regard, a refractive index of the silica 132 may further decrease. An arithmetic mean roughness (Ra) of the convex-concave structure on the surface of the silica layer 13 may be preferably about 10 nm or greater. A mixing ratio (wt %) of the hollow silica particles 131a and a fluorine compound may be controlled so that an arithmetic mean roughness (Ra) of the surface of the silica layer 13 is about 10 nm or greater. That is, the ratio of the hollow silica particles 131a:fluorine compound is preferably about 100:3≤100:X≤about 100:5. Here, X may be a natural number, a rational number, or an irrational number. A surface area strength of 3690 $cm^{-1}$ of the fluorinated hollow silica particles 131 is preferably about 0.5 or lower. Also, the hydroxyl group to which a fluorine functional group has not been introduced reacts with a polysilazane, at a surface of the hollow silica particle 131a. In this regard, the hydroxyl group is incorporated in a covalent bond of Si—O—Si during conversion of a polysilazane to silica.

Also, when an amount of the fluorine compound being mixed is excessively high, unreacted fluorine compound may remain. When the unreacted fluorine compound remains, the silica 132 may be cloudy. This is because the remaining fluorine compound is not dissolved in the polysilazane solution, thereby being precipitated therein, when the polysilazane solution and the fluorinated hollow silica particle 131 are mixed.

<Description of Particle Diameter Distribution of Fluorinated Hollow Silica Particle 131>

Also, the fluorinated hollow silica particles 131 may preferably have a plurality of relative maximum points on a frequency-particle size curve (a particle size distribution curve) showing particle size distribution of the fluorinated hollow silica particles 131. That is, the fluorinated hollow silica particles 131 may comprise two or more sets of particles with each set having a particle size distribution different from others.

Figure 6:
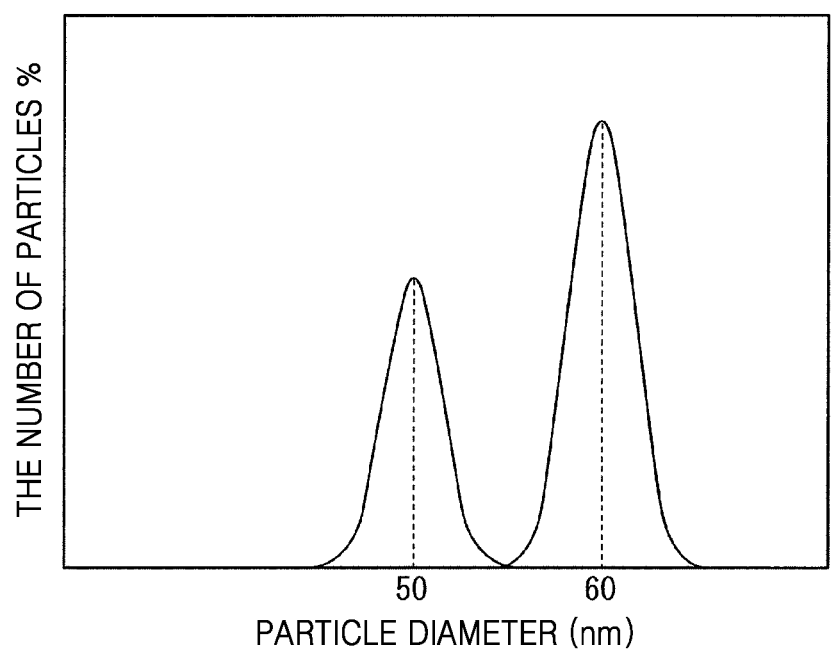
FIG. 6 is a graph that illustrates a particle diameter distribution curve of fluorinated hollow silica particles according to another embodiment.

FIG. 6 is a view that illustrates a particle size distribution curve of the fluorinated hollow silica particles 131 according to an embodiment. In FIG. 6, the horizontal axis represents particle diameters of the fluorinated hollow silica particles 131, and the vertical axis represents frequency distribution corresponding to particle diameters in number %.

As shown in FIG. 6, the fluorinated hollow silica particles 131 have two relative maximum points at 50 nm and 60 nm of median particle diameter. This may be achieved by mixing fluorinated hollow silica particles having a median particle diameter of 50 nm and fluorinated hollow silica particles having a median particle diameter of 60 nm.

In this regard, a surface area of the fluorinated hollow silica particles 131 is increased by mixing fluorinated hollow silica particles having different median particle diameters. Thus, a strength of the silica layer 13 may be improved.

<Description of Reactive Silicon Compound>

Also, in some embodiments, the silica layer 13 may further include a reactive silicon compound.

Here, the reactive silicon compound is a material having a dimethyl silicon main chain. Also, the reactive silicon material is preferably a material having a hydroxyl group, an amino group, or an isocyanate group at two or more locations selected from an end part, both end parts and a side chain part. Also, an average molecular weight (Mn) of the reactive silicon compound may preferably be Mn≥about 5,000, or, more preferably, Mn≥about 10,000. In particular, when the average molecular weight (Mn) of the reactive silicon compound is Mn<about 5,000, a strength of the silica layer 13 may not be improved, as will be described in detail later. The reactive silicon compound satisfying these features may be, for example, Silaplane FM-DA26 (available from JNC Inc.). Also, Silaplane FM-4425 (available from JNC Inc.) may be used as the reactive silicon compound.

Also, an amount of the reactive silicon compound may be, preferably, about 0.5 wt % or more. Also, an amount of the reactive silicon compound may be, preferably, about 3 wt % or less. Also, these amounts are based on a case where the total amount of a polysilazane, the fluorinated hollow silica particles 131, and the reactive silicon compound is 100 wt %. When the amount of the reactive silicon compound is less than about 0.5 wt %, a strength of the silica layer 13 may not be improved. Also, when the amount of the reactive silicon compound is greater than about 3 wt %, haze may easily occur.

The reactive silicon compound binds with a hydroxyl group existing on a surface of the hollow silica particles 131a. In this regard, the reactive silicon compound is mainly distributed on a surface of the fluorinated hollow silica particles 131. Also, as described above, the fluorinated hollow silica particles 131 may be more concentrated in a surface portion of the silica layer 13. Therefore, the reactive silicon compound may also be more concentrated in a surface portion of the silica layer 13.

The reactive silicon compound may also bind with a polysilazane. That is, when the reactive silicon compound is added, the fluorinated hollow silica particles 131 may bind to each other. Also, the fluorinated hollow silica particles 131 and the silica 132 are bound after a polysilazane is converted to silica. As a result, when the reactive silicon compound is added, strength of the silica layer 13 further improves.

Also, the reactive silicon compound mainly exists on a surface of the silica layer 13, and thus friction of the surface of the silica layer 13 may be reduced. As a result, slipperiness of the surface of the silica layer 13 may improve.

<Description of Method of Forming Silica Layer>

Then, a method of forming the silica layer 13 will be described.

Figure 7:
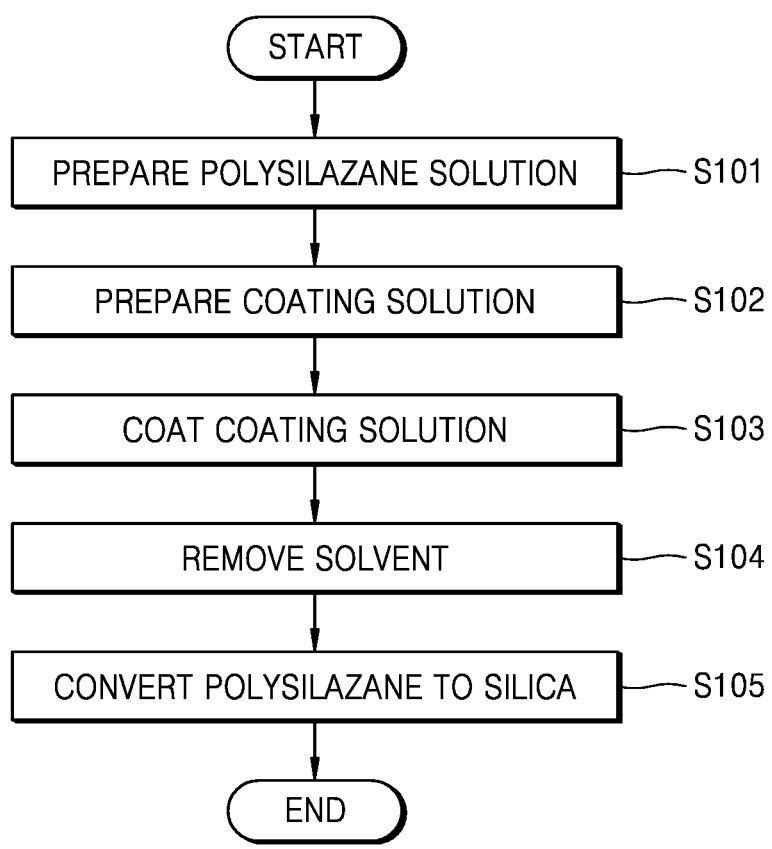
FIG. 7 is a flowchart that illustrates a method of forming a silica layer according to another embodiment.
Figure 8:
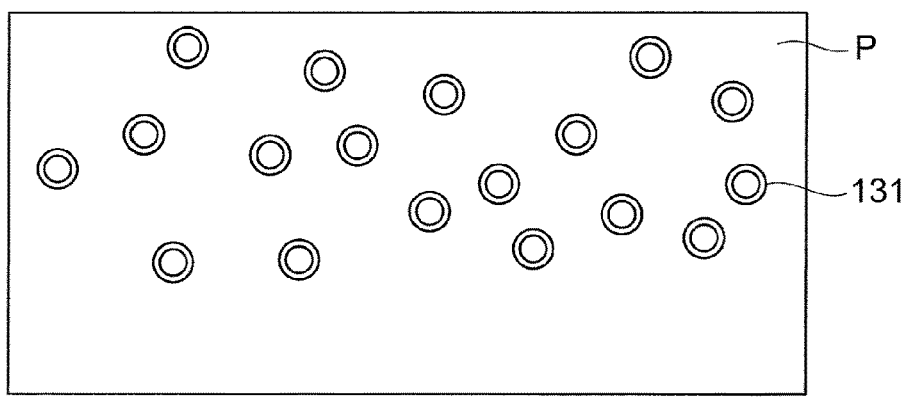
FIG. 8 is a view that illustrates each process state of a method of forming a silica layer according to another embodiment.
Figure 9:
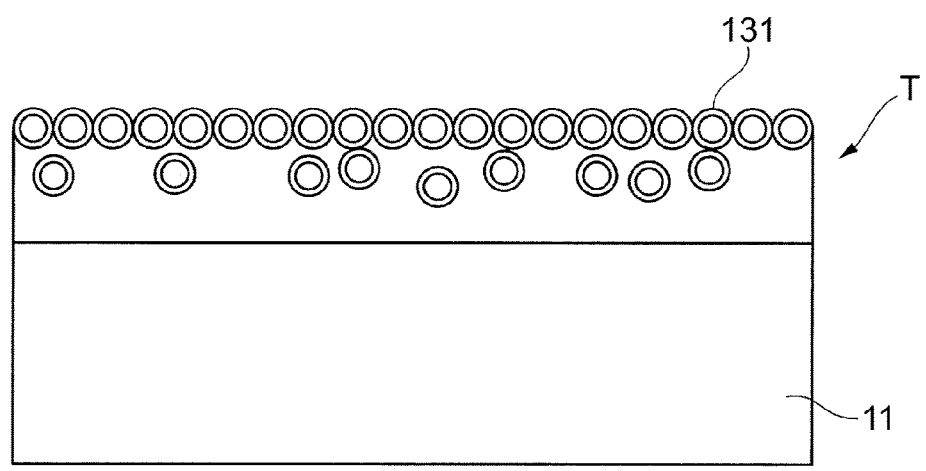
FIG. 9 is a view that illustrates each process state of a method of forming a silica layer according to another embodiment.
Figure 10:
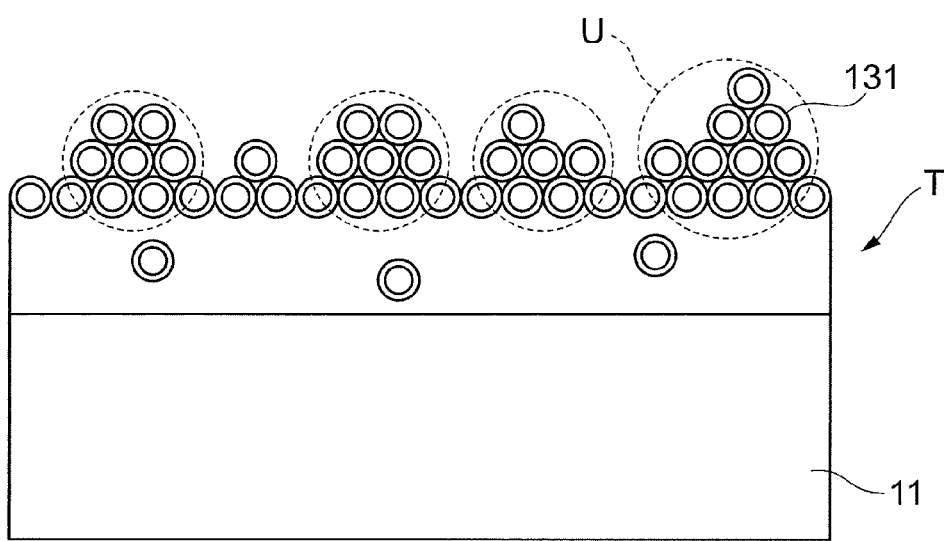
FIG. 10 is a view that illustrates each process state of a method of forming a silica layer according to another embodiment.

FIG. 7 is a flowchart that explains a method of forming the silica layer 13 according to an embodiment. Also, FIGS. 8 to 10 each illustrate states of the process. Hereinafter, the method of forming the silica layer 13 according to an embodiment will be described with reference to FIGS. 7 to 10.

First, a polysilazane solution (p) is prepared by dissolving a polysilazane in a solvent (step 101). A polysilazane is highly reactive and is hydrolyzed by easily reacting with a material having a hydroxyl group. In this regard, a hydrophobic non-polar organic solvent is used as the solvent. Examples of the solvent may include dibutyl ether or xylene. Also, the solvent may be mineral turpentine (a petroleum-based hydrocarbon) or a high-boiling point aromatic-based solvent. The polysilazane solution may be, for example, a polysilazane product available from AZ Electronic Materials. This polysilazane solution uses dibutylether as a solvent. Also, the reactive silicon compound may be added thereto.

Subsequently, the fluorinated hollow silica particles 131 are mixed in the polysilazane solution (p) to prepare a coating solution (a coating solution for forming a silica layer) (step 102—a coating solution preparation process). The coating solution is in the state shown in FIG. 8. A composition ratio (wt %) of the polysilazane and the fluorinated hollow silica particles 131 in the coating solution may preferably be in a range of about 94:6 to about 98:2. When an amount of the fluorinated hollow silica particles 131 is higher than about 6 wt %, the fluorinated hollow silica particles 131 may be excessively agglomerated on a surface of a coating layer T, which will be described later. As a result, haze may occur.

When an amount of the fluorinated hollow silica particles 131 in the coating solution is lower than about 2 wt %, agglomeration of the fluorinated hollow silica particles 131 may not occur. As a result, the first surface of the silica layer 13 mainly includes silica and thus may be flattened, and the low-refractive index layer 135 may not be formed.

Next, the coating solution is applied on a substrate 11 (step 103—a coating process). A method of applying the coating solution on the substrate 11 is not particularly limited, and any method such as a dye coating method that is common in the art may be used. Also, the method is not limited to the dye coating method, and examples of the method may include gravure coating or spray coating. When the coating solution is applied on the substrate 11, the coating layer T formed of the coating solution is formed on the substrate 11. The fluorinated hollow silica particles 131 in the coating layer T bleed out to a surface of the coating layer T due to a surface tension difference with respect to the solvent, and thus agglomerate (a state in FIG. 9). Here, when a mixing ratio (wt %) of the hollow silica particles and the fluorine compound is within the range as described above, the fluorinated hollow silica particles 131 agglomerate and form a fine sea-island structure U (a state in FIG. 10).

Then, the solvent in the coating layer T is dried and removed (step 104—a drying process). The solvent may be removed by, for example, heating the coating layer T at a temperature of about 100° C. for about 2 minutes or more.

Next, a polysilazane in the coating layer T is converted to silica (step 105—a converting process). Also, in the case of a commercially available polysilazane, generally a catalyst is included, and thus conversion of a polysilazane to silica may be facilitated. For example, when a palladium catalyst is included, conversion is performed at room temperature. Here, the conversion to silica is preferably performed at a temperature in a range of about 20° C. or higher to about 40° C. or lower, and at humidity in a range of about 40% or higher to about 65% or lower. Also, when an amine-based catalyst is included, the conversion to silica may be performed by a heating process. In the coating layer T, a surface portion of the coating layer T where the fluorinated hollow silica particles 131 have been bleeded out becomes the low-refractive index layer 135. Also, the opposite surface portion mainly formed of the silica 132 prepared by conversion of a polysilazane to silica becomes the hard coat layer 136. Thus, the silica layer 13 is formed. Also, the drying process and the silica conversion process together harden the coating solution and thus may be deemed as a hardening process of the silica layer 13. Also, when the hardening process is performed in the state of FIG. 9, the silica layer 13 shown in FIG. 2B is formed. Further, when the hardening process is performed in the state of FIG. 10, the silica layer 13 shown in FIG. 2A is formed.

As described above, the silica layer 13 according to an embodiment is a cured product film made from a polysilazane to which the fluorinated hollow silica particles 131 have been added. Here, a fluorine functional group that has low reactivity with a polysilazane is introduced to a hydroxyl group on a surface of the hollow silica particles 131a. In this regard, a reaction with a polysilazane may be suppressed, and clouding of the polysilazane solution may be suppressed. Also, strength of the silica layer 13 after the conversion of a polysilazane to silica may be maintained.

Further, the fluorinated hollow silica particles are unevenly distributed on a surface of the silica layer 13. An air layer is contained in an inside of the fluorinated hollow silica particles. Therefore, a visible light reflectance of the low-refractive index layer 135 at a surface of the silica layer 13 is suppressed to be about 0.3% or lower, and the silica layer 13 may exhibits a low-refractive index. Also, a surface of the fluorinated hollow silica particles 131 is substantially covered with a fluorine functional group. In this regard, the fluorinated hollow silica particles 131 are formed of bulky structures and thus an antifouling property and a slippery property may be improved. A contact angle of the surface of the silica layer 13 (e.g., the surface of the low-refractive index layer 135) may preferably be about 100° or greater.

Also, when the fluorinated hollow silica particles 131 are unevenly distributed toward a surface of the silica layer 13, a side of the silica layer 13 which faces with the substrate 11 may mostly include the silica 132. Accordingly, strength deterioration may not easily occur at the side of the silica layer 13 which faces with the substrate 11 due to the presence of the fluorinated hollow silica particles 131. Therefore, strength of the whole silica layer 13 improves.

Further, when the fluorinated hollow silica particles 131 comprise two or more sets of particles with each set having a median particle size different from others, strength of the silica layer 13 may further improve.

Also, when a mixing ratio of the hollow silica particles 131a and the fluorine compound is controlled, a fine sea-island structure may be formed on the surface of the silica layer 13. The mixing ratio of the hollow silica particles 131a:the fluorine compound may be about 100:3≤100:x≤about 100:5 as described above. That is, due to the sea-island structure formed by using the fluorinated hollow silica particles, bumps may be formed on a surface of the silica layer 13 after conversion to silica. In this regard, a refractive index of the surface of the silica layer 13 may be further decreased. Also, the surface of the silica layer 13 may have low friction, and thus slipperiness thereof may increase.

MODE OF THE INVENTION

Example

Hereinafter, embodiments will be described in detail by referring to Examples. However, the present disclosure is not limited to Examples as long as the inventive concept is pertained to.

Hereinafter, the silica layer 13 according to an embodiment will be described with reference to Examples A1 to A4 and Comparative Examples A1 to A8.

Example A1

First, 100 g of Surulia 4320 hollow silica particles (20.7 wt %, available from Nikki Shokubai Kasei Co., Ltd.) is dissolved in 107 g of methyl isobutyl ketone (MIBK). Accordingly, a 10 wt % solution of the hollow silica particles was prepared. Then, 3.105 g of KY-108 (20 wt %, available from Shin-Etsu Chemical Co., Ltd.) was added to the hollow silica particle solution. Also, the solution was stirred at 50° C. for 24 hours to obtain 206 g of fluorinated hollow silica particles F-1. Thereafter, under a nitrogen atmosphere, 6 parts by weight of the fluorinated hollow silica particles F-1 as an effective ingredient was added to 94 parts by weight of a polysilazane (20 wt %, available from AZ Electronic Materials Inc.; a solvent for the polysilazane was dibutyl ether) as an effective ingredient. The solution was stirred for 10 minutes. Thereafter, dibutyl ether was added and gently stirred for 10 minutes to complete a coating solution including 1.5 wt % of solids. Subsequently, the coating solution was applied on polymethyl methacrylate (PMMA) by using a wire bar as a layer of thickness of about 105 nm. Then, the PMMA substrate having the coating layer thereon was dried at 100° C. for about 1 minute and left at room temperature (23° C.) at humidity of 54% for 7 days. Thus, the silica layer 13 was prepared on the PMMA substrate.

Example A2

100 g of Surulia 4320 was dissolved in 107 g of MIBK to prepare a 10 wt % hollow silica particle solution. Then, 5.175 g of KY-108 was added to the hollow silica particle solution, and the mixture was stirred at 50° C. for 24 hours to obtain 202 g of fluorinated hollow silica particles F-2. A method of preparing the silica layer 13 thereafter was the same as used in Example A1, except that the fluorinated hollow silica particles F-2 were used.

Example A3

Fluorinated hollow silica particles F-1 were prepared in the same manner as in Example A1. A method of preparing the silica layer 13 thereafter included adding 4 parts by weight of the fluorinated hollow silica particles F-1 as an effective ingredient to 96 parts by weight of a polysilazane as an effective ingredient to prepare a coating solution. The rest of the process was the same as used in Example A1 to prepare the silica layer 13.

Example A4

Fluorinated hollow silica particles F-1 were prepared in the same manner as in Example A1. A method of preparing the silica layer 13 thereafter included adding 2 parts by weight of the fluorinated hollow silica particles F-1 as an effective ingredient to 98 parts by weight of a polysilazane as an effective ingredient to prepare a coating solution. The rest of the process was the same as used in Example A3.

Comparative Example A1

100 g of Surulia 4320 was dissolved in 107 g of MIBK to prepare a 10 wt % hollow silica particle solution. Then, 0.1035 g of KY-108 was added to the hollow silica particle solution, and the mixture was stirred at 50° C. for 24 hours to obtain 201 g of fluorinated hollow silica particles F-3. A method of preparing the silica layer 13 thereafter was the same as used in Example A1, except that the fluorinated hollow silica particles F-3 were used.

Comparative Example A2

100 g of Surulia 4320 was dissolved in 107 g of MIBK to prepare a 10 wt % hollow silica particle solution. Then, 1.035 g of KY-108 was added to the hollow silica particle solution, and the mixture was stirred at 50° C. for 24 hours to obtain 203 g of fluorinated hollow silica particles F-4. A method of preparing the silica layer 13 thereafter was the same as used in Example A1, except that the fluorinated hollow silica particles F-4 were used.

Comparative Example A3

100 g of Surulia 4320 was dissolved in 107 g of MIBK to prepare a 10 wt % hollow silica particle solution. Then, 7.7625 g of KY-108 was added to the hollow silica particle solution, and the mixture was stirred at 50° C. for 24 hours to obtain 210 g of fluorinated hollow silica particles F-5. A method of preparing the silica layer 13 thereafter was the same as used in Example A1, except that the fluorinated hollow silica particles F-5 were used.

Comparative Example A4

100 g of Surulia 4320 was dissolved in 107 g of MIBK to prepare a 10 wt % hollow silica particle solution. Then, 10.35 g of KY-108 was added to the hollow silica particle solution, and the mixture was stirred at 50° C. for 24 hours to obtain 214 g of fluorinated hollow silica particles F-6. A method of preparing the silica layer 13 thereafter was the same as used in Example A1, except that the fluorinated hollow silica particles F-6 were used.

Comparative Example A5

100 g of Surulia 4320 was dissolved in 107 g of MIBK to prepare a 10 wt % hollow silica particle solution. Then, 15.525 g of KY-108 was added to the hollow silica particle solution, and the mixture was stirred at 50° C. for 24 hours to obtain 218 g of fluorinated hollow silica particles F-7. A method of preparing the silica layer 13 thereafter was the same as used in Example A1, except that the fluorinated hollow silica particles F-7 were used.

Comparative Example A6

100 g of Surulia 4320 was dissolved in 107 g of MIBK to prepare a 10 wt % hollow silica particle solution. Then, 20.7 g of KY-108 was added to the hollow silica particle solution, and the mixture was stirred at 50° C. for 24 hours to obtain 224 g of fluorinated hollow silica particles F-8. A method of preparing the silica layer 13 thereafter was the same as used in Example A1, except that the fluorinated hollow silica particles F-8 were used.

Comparative Example A7

Fluorinated hollow silica particles F-1 were prepared in the same manner as in Example A1. A method of preparing the silica layer 13 thereafter included adding 1 part by weight of the fluorinated hollow silica particles F-1 as an effective ingredient to 99 parts by weight of a polysilazane as an effective ingredient to prepare a coating solution. The rest of the process was the same as used in Example A1.

Comparative Example A8

Fluorinated hollow silica particles F-1 were prepared in the same manner as in Example A1. A method of preparing the silica layer 13 thereafter included adding 8 parts by weight of the fluorinated hollow silica particles F-1 as an effective ingredient to 92 parts by weight of a polysilazane as an effective ingredient to prepare a coating solution. The rest of the process was the same as used in Example A1.

(Absorbance Measurement)

An integrated intensity was measured by performing an IR measurement (3690 cm$^{-1}$) of the silica layers 13 prepared in Examples A1 to A4 and Comparative Examples A1 to A8. The measurement device was a Nicolet iS10 FT-IR (available from Thermo Fisher Scientific Inc.).

The evaluation results of Examples A1 to A4 and Comparative Examples A1 to A8 are shown in Table 1. In Table 1, mixing ratios (wt %) of the hollow silica particles and the fluorine compound during surface treatment of hollow silica particles with fluorine are shown. Also, in Table 1, the integrated intensity measured by the IR measurement, and the compositions of a polysilazane and the fluorinated hollow silica particles in the coating solution are shown. Also, the silica layers 13 prepared in Comparative Examples A3 to A6 and A8 were cloudy.

TABLE 1

| | Mixing ratio of Si:F (wt %) | IR integrated intensity (3690 cm$^{-1}$) | Composition (wt %) | |
| | | | Polysilazane | Fluorinated hollow silica particles |
|---|---|---|---|---|
| Example A1 | 100:3 | 0.491 | 94 | 6 |
| Example A2 | 100:5 | 0.384 | 94 | 6 |
| Example A3 | 100:3 | 0.491 | 96 | 4 |
| Example A4 | 100:3 | 0.491 | 98 | 2 |
| Comparative Example A1 | 100:0.1 | 0.643 | 94 | 6 |
| Comparative Example A2 | 100:1 | 0.576 | 94 | 6 |
| Comparative Example A3 | 100:7.5 | 0.953 | 94 | 6 |
| Comparative Example A4 | 100:10 | 1.213 | 94 | 6 |
| Comparative Example A5 | 100:15 | 1.564 | 94 | 6 |
| Comparative Example A6 | 100:20 | 2.215 | 94 | 6 |
| Comparative Example A7 | 100:3 | 0.491 | 99 | 1 |
| Comparative Example A8 | 100:3 | 0.491 | 92 | 8 |

(Evaluation of Minimum Reflectance (minR))

The minimum reflectance values of the silica layers 13 were measured. The measuring device was a spectral colorimeter CM-2600d available from Konica Minolta. Here, sides of the PMMA substrate other than the coated surface of the silica layer 13 were all colored by a black ink. Then, a surface side of the PMMA substrate coated with the silica layer 13 was used for the measurement. A measuring diameter for the measurement was 8 mm, and a viewing angle was 2°. Reflectance (y value, a visible light reflectance) of specular light from a light source corresponding to a D65 light source was measured.

Also, variation of the y value with respect to a frequency of light was obtained, and a value at which the y value is the minimum was used as a minimum reflectivity (minR). The reflectivity or the minimum reflectivity of specular light were parameters corresponding to the refractive index of the silica layer 13, and the lower the minimum reflectivity, the lower the refractive index. A lower value indicates the silica layer 13 having lower reflectivity.

(Evaluation of Contact Angle)

A contact angle of the silica layer 13 was measured. The measuring device was an automatic contact angle meter DM700 available from Kyowa Interface Science Co., Ltd., which was used to measure a contact angle by dropping 2 μl of pure water on the PMMA substrate coated with the silica layer 13. The coating angle is a parameter that influences an antifouling property and slipperiness of the silica layer 13. Also, an evaluation of contact angle for a silica layer 13 having cloudiness was omitted.

(Pencil Hardness Test)

Figure 11:
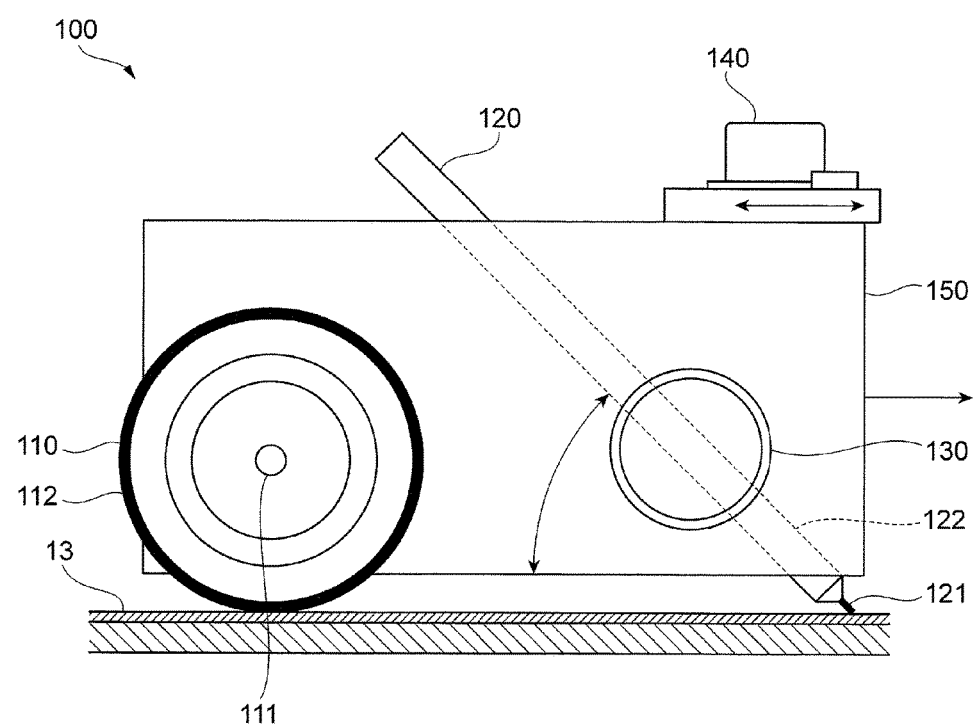
FIG. 11 is a view that illustrates a pencil hardness measuring apparatus that measures a pencil hardness.

FIG. 11 illustrates a pencil hardness measuring device 100 for measuring pencil hardness.

The pencil hardness measuring device 100 includes a wheel 110, a pencil 120, and a pencil linking port 130. Also, the pencil hardness measuring device 100 includes a level instrument 140 and a case 150.

The wheel 110 is located at each of two sides of the case 150. The two wheels 110 are connected by an axle 111. The axle 111 is installed in the case 150 by using a bearing that is not shown in the drawing. Also, the wheels 110 are formed of a metal material and may have a ring 112 having an O-shape on the outer circumference.

The pencil 120 is installed in the case 150 through the pencil linking port 130. The pencil 120 has a lead 121 having hardness at a front end part. The pencil 120 is installed at an angle of 45° with respect to the PMMA substrate having the silica layer 13, which is the subject of the test. Also, the front end part of the lead 121 contacts the PMMA substrate having the silica layer 13. The lead 121 is controlled to be exposed at a length of 5 mm to 6 mm by cutting out a wood portion 122. Also, the front end part of the lead 121 is ground to be flattened by using sandpaper. Also, a load of 500 g is elastically-pressed onto the PMMA substrate having the silica layer 13 at the front end part of the lead 121.

In this configuration, the pencil hardness measuring device 100 may be moved by pressing the case 150. That is, when the pencil hardness measuring device 100 is pressed, the substrate 11 having the silica layer 13 may be moved to the left or right. Here, the wheel 110 rotates, and the lead 121 of the pencil 120 moves on the silica layer 13 while being intimately pressed against the silica layer 13.

When the pencil hardness is measured, a horizontal level is first confirmed by using the level instrument 140. Then, the lead 121 of the pencil 120 is pressed against the substrate 11 having the silica layer 13 thereon, and is moved to the right side of the drawing. Here, the pressing may be performed at a rate of 0.8 mm/s and to a distance of at least 7 mm. Also, scratches made on the silica layer 13 are confirmed by the naked eye. These may be sequentially performed by changing the pencil 120 and varying the hardness of the lead 121 from 6B to 6H. Also, a hardness of the lead 121 that was the greatest hardness at which no scratches were made was determined as a pencil hardness.

A greater pencil hardness indicates that the silica layer 13 is harder. Also, an evaluation of pencil hardness for a silica layer 13 having cloudiness was omitted.

(Evaluation of Surface Roughness)

Surface roughness of the silica layer 13 was measured. The surface roughness measurement was performed by non-contact 3-dimensional (3D) measurement of the subject using a laser, and thus 3D data of the whole observation view was obtained. As an image-analyzing laser microscope, used was VK-9500 available from Keyence Japan. An average value (an arithmetic mean roughness (Ra)) of the maximum bump height was obtained by using values from 5-points in the measured surface area. Also, an evaluation for the silica layer 13 having cloudiness was omitted.

The evaluations described above and the results of the evaluations are shown in Table 2.

TABLE 2

| | Evaluation result | | | |
| | Minimum reflectance (%) | Contact angle (°) | Pencil hardness | Arithmetic mean roughness (Ra) (nm) |
|---|---|---|---|---|
| Example A1 | 0.29 | 104.3 | 2h | 12 |
| Example A2 | 0.24 | 108.6 | 2h | 16 |
| Example A3 | 0.25 | 103.5 | 2h | 13 |
| Example A4 | 0.29 | 104.3 | 2h | 11 |
| Comparative Example A1 | 1.27 | 61.3 | 2h | 8 |
| Comparative Example A2 | 1.25 | 78.2 | 2h | 7 |
| Comparative Example A3 | Cloudy | — | — | — |

TABLE 2-continued

| | Evaluation result | | | |
|---|---|---|---|---|
| | Minimum reflectance (%) | Contact angle (°) | Pencil hardness | Arithmetic mean roughness (Ra) (nm) |
| Comparative Example A4 | Cloudy | — | — | — |
| Comparative Example A5 | Cloudy | — | — | — |
| Comparative Example A6 | Cloudy | — | — | — |
| Comparative Example A7 | 1.89 | 91.6 | 2h | 5 |
| Comparative Example A8 | Cloudy | — | — | — |

As described above, the silica layers 13 prepared in Comparative Examples A3 to A6 and A8 were cloudy. In Comparative Examples A3 to A6, a mixing amount of the fluorine compound is high, and an unreacted fluorine compound is mixed with the fluorinated hollow silica particles during surface treatment of the hollow silica particles with fluorine. Therefore, it may be deemed that the unreacted fluorine compound was isolated and agglomerated when the fluorine compound was mixed in the polysilazane solution. Also, in Comparative Example A8, a proportion of the fluorinated hollow silica particles in the coating solution is high, and thus, it may be deemed that the agglomeration of the fluorinated hollow silica particles on the surface of the coating layer is excessive.

Comparing Examples A1 to A4 with Comparative Examples A1, A2, and A7, the minimum reflectivities of Examples A1 to A4 are all 0.3% or lower, which is lower than the minimum reflectivities of Comparative Examples A1, A2, and A7. In Examples A1 to A4, the arithmetic mean roughness (Ra) of the surface of the silica layer 13 is 10 nm or greater, and thus it is deemed that the minimum reflectivity is reduced due to the air layer formed on the surface of the silica layer 13.

Comparing Examples A1 to A4 with Comparative Examples A1, A2, and A7, contact angles of Examples A1 to A4 are all 100° or greater, and thus antifouling properties of Examples A1 to A4 are better than those of Comparative Examples A1, A2, and A7. The fluorine-surface treatment ratio in the fluorinated hollow silica particles on the surface of the silica layers 13 of Examples A1 to A4 are higher than that of the silica layer 13 of Comparative Examples A1 and A2. Amounts of the fluorinated hollow silica particles on the surface of the silica layers 13 of Examples A1 to A4 are more than that of the silica layer 13 of Comparative Example A7. Thus, it is deemed that an antifouling property of the silica layer 13 is improved due to the fluorinated hollow silica particles on the surface of the silica layer 13.

Comparing Examples A1 to A4 with Comparative Examples A1, A2, and A7, all the pencil hardnesses are 2h, and thus, it can be seen that all the silica layers 13 prepared in Examples A1 to A4 and Comparative Examples A1, A2, and A7 have a high strength. In this regard, it can be seen that the silica layer 13 having a high strength was obtained by converting a polysilazane to silica.

As it may be known from the evaluation results of the silica layers 13 prepared in Examples A1 to A4 and Comparative Examples A1 to A8, the silica layer 13 according to an embodiment is formed from a polysilazane and fluorinated hollow silica particles having reduced reactivity with a polysilazane, and thus the reaction between a polysilazane before the conversion to silica and the fluorinated hollow silica particles is suppressed such that cloudiness of the polysilazane solution is prevented and the silica layer 13 may have high strength. Also, when the fluorinated hollow silica particles are used, a low-refractive index may be imparted upon the silica layer 13 according to an embodiment or an antifouling property thereof may improve.

Next, a case of using the fluorinated hollow silica particles 131 having different particle distributions will be described. A case of using a reactive silicon will also be described.

Formation of Silica Layer 13

Example B1

Two types of hollow silica particles were used as the hollow silica particles 131a. That is, Surulia 4320 available from Nikki Shokubai Kasei Co., Ltd. (having a median particle diameter of 60 nm and a solid content of 20.7 wt %) was used. In addition, Surulia 2320 available from Nikki Shokubai Kasei Co., Ltd. (having a median particle diameter of 50 nm and a solid content of 20.5 wt %) was used. Also, 62.2 g of Surulia 4320 and 37.7 g of Surulia 2320 were dissolved in 106.2 g of MIBK. In this regard, a 10 wt % hollow silica particle solution was prepared. Here, a weight ratio of solids of Surulia 4320 to Surulia 2320 was 5:3. Then, 5.152 g of KY-108 (20 wt %) available from Shin-Etsu Chemical Co., Ltd. was added to the hollow silica particle solution, and the solution was stirred at 50° C. for 24 hours. Thus, a fluorinated hollow silica particle solution was prepared. Here, a weight ratio of the hollow silica particles 131a to the fluorine compound was 100:5.

Also, a polysilazane was obtained from AZ Electronic Materials Inc. (solvent: dibutyl ether, 20 wt %). Also, under a nitrogen atmosphere, 92 parts by weight of a polysilazane, as an effective ingredient, and 8 parts by weight of the fluorinated hollow silica particle solution, as an effective ingredient, were added. The resulting solution was stirred for 10 minutes. Thereafter, dibutyl ether was added to the solution. The solution was then gently stirred for about 10 minutes to prepare a coating solution including 1.5 wt % of solid. Then, the coating solution was coated as a layer of thickness of 105 nm on the PMMA substrate by using a wire bar. Then, the PMMA substrate having the coating layer was dried at 100° C. for about 1 minute. Also, the PMMA substrate was kept at room temperature (23° C.) and at a humidity of 54% for 7 days, and thus the silica layer 13 was formed on the PMMA substrate.

Examples B2 and B3 and Comparative Examples B1 to B4

In Examples B2 and B3 and Comparative Examples B1 to B4, ingredients used to prepare the silica layer 13 in Example B1 were changed as shown in FIG. 12. The rest of the process was the same as performed in Example B1.

As shown in FIG. 12, the fluorinated hollow silica particles having two different median particle diameters were used in Examples B1 to B4. On the other hand, only Surulia 4320 (having a median particle diameter of 60 nm) was used as the fluorinated hollow silica particles in Comparative Examples B1 to B4.

Examples B4 and B5 and Comparative Example B5

In Examples B4 and B5 and Comparative Example B5, ingredients used to prepare the silica layer 13 in Example B1 were changed as shown in FIG. 12. The rest of the process was the same as performed in Example B1 to prepare the silica layer 13.

As shown in FIG. 12, the fluorinated hollow silica particles having two different median particle diameters were used in Example B4. Also, the reactive silicon was added to the coating solution at a concentration of 1 wt %. The reactive silicon was Silaplane FM-DA26 available from JNC Inc.

Also, Surulia 2320 (having a median particle diameter of 50 nm) was not used as the fluorinated hollow silica particles in Example B5. That is, only Surulia 4320 (having a median particle diameter of 60 nm) was used as the fluorinated hollow silica particles. Also, the reactive silicon was added to the coating solution at a concentration of 3 wt %.

Also, only Surulia 4320 (having a median particle diameter of 60 nm) was used as the fluorinated hollow silica particles in Comparative Example B5. The reactive silicon was added to the coating solution at a concentration of 4 wt %.

[Evaluation Method]

A reflectivity (y-value) of the silica layer 13, minR, an SW scratch test, and pencil hardness were evaluated. Hereinafter, the evaluation methods will be described.

(y-Value, minR)

As described above, the reflectivity (y-value) and the minimum reflectivity (minR) of specular light were measured.

(SW Scratch Test)

A front end of a 1 cm² cylinder with the front end being wound with steel wool (SW) was intimately contacted with a surface of the substrate 11 having the silica layer 13 thereon. Also, in order to perform the scratch test, a load was applied to the SW, and, the SW was moved back and forth 10 times (a moving distance of 70 mm). Here, the moving rate was 140 mm/s. Also, the load was changed, and the occurrence of scratches was confirmed with the naked eye.

According to the SW scratch test, a higher value indicates that strength of the silica layer 13 was high.

(Pencil Hardness Test)

The pencil hardness test was performed as described above.

[Evaluation Result]

The evaluation results are shown in FIG. 12.

Also, in the SW scratch test of FIG. 12, a value to which "NG" is not given indicates that scratches did not occur under a given load. A value to which "NG" is given indicates that scratches occurred under a given load.

As shown in the drawing, the y-values and minRs of all Examples B1 to B5 and Comparative Examples B1 to B5 were comparably good.

Regarding the SW scratch test and the pencil hardness, the results from Examples B1 to B3 were all better than those of Comparative Examples B1 to B3. That is, it may be known that the layer strengths of those using the fluorinated hollow silica particles 131 having two types of median particle diameters were higher. In particular, Example B1 and Comparative Example B1 which used the same amount of the fluorinated hollow silica particles 131 were compared. Also, Example 2B and Comparative Example 2B were compared. Also, Example B3 and Comparative Example B3 were compared. According to the comparison, a layer strength of Comparative Example B1 was higher than that of Example B 1. Also, a layer strength of Comparative Example B2 was higher than that of Example B2. Also, a layer strength of Comparative Example B3 was higher than that of Example B3.

Also, regarding the SW scratch test and the pencil hardness, the results of Examples B4 and B5 were better than that of Comparative Example B4. That is, it may be known that layer strengths of those using the reactive silicon were higher than the other. Also, haze occurred in Comparative Example 5 using 4 wt % of the reactive silicon. Therefore, it is preferably that the reactive silicon is 3 wt % or lower as in Example B5.

Also, Examples and Comparative Examples described above are classified for convenience of description. That is, the more desirable display devices are classified as Examples, while others are classified as Comparative Examples. That is, Comparative Examples do not necessarily indicate that those cannot be used as the silica layer 13.

Subsequently, evaluation was performed by preparing the polarizing film D according to an embodiment.

Preparation of Polarizing Film D

Example C1

The polarizing film D was prepared by inserting and bonding a resin film that has iodine compound molecules in PVA between resin films formed of TAC. Here, no air was allowed to penetrate inside. Also, the silica layer 13 was prepared on one surface of the TAC films according to the conditions in Example A4.

Comparative Example C1

A polarizing film was prepared in the same manner as in Example C1 without forming the silica layer 13.

[Evaluation Method]

A y-value, minR, and color as optical properties of the polarizing film D were evaluated. Also, an evaluation of a polarizing plate performance of the polarizing film D was performed.

The y value and minR of the polarizing film D were measured as described above. Also, the color of the polarizing film D was measured by using the same device.

The polarizing plate performance was measured as follows. First, the polarizing film D was set in the UV/Visible light spectrometer V-7100 available from Japan Spectroscopy Corporation. Then, the UV/Visible light spectrum was obtained when a straight polarizing light in a transmission axis direction was incident to the polarizing film D. Also, the UV/visible light spectrum was obtained when straight polarizing light in an absorption axis direction was incident to the polarizing film D. Then, a light transmittance and a degree of polarization were obtained according to the UV/visible light spectrum.

[Evaluation Result]

The evaluation results are shown in FIG. 13.

Comparing Example C1 and Comparative Example C1, the y-value and minR as the optical properties of Example C1 were significantly decreased as compared with those of Comparative Example C1. This indicates that reflectivity was significantly lowered. Also, the color of the films in Example C1 was not significantly different from that of Comparative Example C1.

Also, in terms of the polarizing plate performance, the polarizing degrees of the films of Example 1 were substantially the same as that of Comparative Example 1. Also, the total transmittance of Example C1 was higher than that of Comparative Example C1. The film of Example C1 exhibited better performance than the film of Comparative Example C1.

Then, an evaluation of a display device 1 using the polarizing film D of Example C1 was performed.

Preparation of Display Device 1

Example D1

The polarizing film D of Example C1 was mounted on the display device 1.

Comparative Example D1

The polarizing film D of Comparative Example C1 was mounted on the display device 1.

[Evaluation Method]

A y-value of the surface of the display device 1 was measured as described above. During the measurement, the display device 1 was powered-off.

[Evaluation Result]

A y-value of the display device 1 of Example D1 was 2.3%, whereas a y-value of the display device 1 of Comparative Example D1 was 6%.

That is, the display device 1 of Example D1 had low reflectivity as compared with that of the display device of Comparative Example D1, and external light reflection was suppressed. Also, when an image was displayed by operating the display device 1 of Example D1, external light reflection was reduced, and a fine image was displayed.

Although the display device 1 in the examples above had the silica layer 13 formed on a liquid crystal panel, embodiments are not limited thereto. For example, the silica layer 13 may be formed on an organic EL display or a Braun tube display. Also, application of the silica layer 13 is not limited to a display device, and may be formed on a surface of a lens. In this case, the substrate 11 may serve as a main body of a lens that may be formed of glass or plastic. Also, the lens having the silica layer 13 is an example of an optical element.

According to another embodiment, a silica layer includes silica and fluorinated hollow silica particles. The silica is formed by converting a polysilazane to silica. The fluorinated hollow silica particles are unevenly distributed with a greater concentration toward a surface side.

According to another embodiment, the silica layer may further include a reactive silicon compound.

According to another embodiment, a part where the fluorinated hollow silica particles are concentrated may function as a low-refractive index layer. Also, a part other than the part where the fluorinated hollow silica particles are concentrated may function as a hard coat layer.

According to another embodiment, the fluorinated hollow silica particles may include a fluorine functional group which is introduced to a part of hydroxyl groups existing on the hollow silica particles.

According to another embodiment, the fluorine functional group may be a (per)fluoro alkyl group and/or a (per)fluoro polyether group.

According to another embodiment, the fluorinated hollow silica particles may have a plurality of relative maximum points in a frequency-particle size curve that illustrate a particle diameter distribution of the fluorinated hollow silica particles.

According to another embodiment, an integrated intensity at 3690 cm$^{-1}$ of the fluorinated hollow silica particles may be about 0.5 or lower.

According to another embodiment, a reflectivity of a surface of the low-refractive index layer may be about 0.3% or lower.

According to another embodiment, the silica layer may have bumps on a surface thereof, and an arithmetic mean roughness (Ra) of the surface may be about 10 nm or greater.

According to another embodiment, an optical element includes a substrate and a silica layer formed on the substrate. The silica layer includes silica and fluorinated hollow silica particles. Silica is formed by converting polysilazane. The fluorinated hollow silica particles are unevenly distributed at a greater concentration toward a surface side.

According to another embodiment, a polarizing element includes a polarizing means that polarizes light and a silica layer that is formed on the polarizing means. The silica layer includes silica and fluorinated hollow silica particles. Silica is formed by converting polysilazane. The fluorinated hollow silica particles are unevenly distributed at a greater concentration toward a surface side.

According to another embodiment, a coating solution for forming a silica layer includes a polysilazane, fluorinated hollow silica particles, and a solvent. The solvent disperses the polysilazane and the fluorinated hollow silica particles.

According to another embodiment, the coating solution for forming a silica layer may further include a reactive silicon compound.

According to another embodiment, a composition ratio (wt %) of the polysilazane and the fluorinated hollow silica particles may be in a range of about 94:6 to about 98:2.

According to another embodiment, the solvent may be a hydrophobic non-polar organic solvent.

According to another embodiment, a method of forming a silica layer includes a coating solution preparation process, a coating process, and a hardening process. The coating solution preparation process prepares a coating solution for forming a silica layer. The coating process coats the coating solution. The hardening process hardens the coated coating solution to prepare a silica layer. In the coating solution preparation process, the coating solution including a polysilazane, fluorinated hollow silica particles, and a solvent is prepared. The solvent disperses the polysilazane and the fluorinated hollow silica particles. The hardening process includes a process of converting the polysilazane to silica.

According to another embodiment, the coating process may be performed by dye coating, gravure coating, or spray coating the coating solution.

According to another embodiment, the hardening process includes a drying process that removes the solvent and may include performing a heating process at a temperature of about 100° C. or higher for about 2 minutes or more.

According to another embodiment, the hardening process includes a converting process that converts a polysilazane to silica, and a temperature of the converting process is within a range of about 20° C. to about 40° C., and a relative humidity in a range of about 40% to about 65%.

According to another embodiment, the silica layer may be prepared by using the method of forming a silica layer.

According to another embodiment, a display device includes a display means that displays an image and a silica layer that is formed on a surface of the display means. The silica layer includes silica and fluorinated hollow silica particles. Silica is formed by converting a polysilazane to silica. The fluorinated hollow silica particles are unevenly distributed at a greater concentration toward a surface side of the silica layer.

According to another embodiment, the display means may be a liquid crystal panel.

The invention claimed is:

1. An optical element comprising:
    a substrate; and
    a silica film disposed on the substrate,
    wherein the silica film has a first surface and a second surface, the first and second surfaces being opposite to each other,
    the silica film includes silica and fluorinated hollow silica particles distributed in the silica, the fluorinated hollow silica particles being different from the silica, and the silica being formed by converting a polysilazane to the silica,
    the fluorinated hollow silica particles are unevenly distributed with a greater concentration toward the first surface, and
    the first surface of the silica film has an undulating structure.

2. The optical element of claim 1, wherein the silica film further comprises a reactive silicon compound.

3. The optical element of claim 1, wherein a region of the silica film where the fluorinated hollow silica particles are concentrated is a low-refractive index layer, and a region other than the region where the fluorinated hollow silica particles are concentrated is a hard coat layer.

4. The optical element of claim 1, wherein the fluorinated hollow silica particles are hollow silica particles having a fluorine functional group that is introduced to a part of hydroxyl groups existing on a surface of the hollow silica particles.

5. The optical element of claim 4, wherein the fluorinated functional group comprises at least one selected from a (per)fluoro alkyl group and a (per)fluoro polyether group.

6. The optical element of claim 1, wherein the fluorinated hollow silica particles have at least two particle diameter distributions which are different from each other.

7. The optical element of claim 1, wherein an arithmetic mean roughness (Ra) of the first surface is 10 nm or higher.

8. The optical element of claim 1, wherein the substrate is a polarizing means for polarizing light.

9. The optical element of claim 1, wherein the silica film is formed from a coating solution for forming a silica film, the coating solution comprising:
    the polysilazane or a mixture of the polysilazane and a reactive silicon compound;
    the fluorinated hollow silica particles; and
    a solvent that disperses the polysilazane and the fluorinated hollow silica particles.

10. The optical element of claim 9, wherein a weight ratio of the polysilazane and the fluorinated hollow silica particles is in a range of about 94:6 to about 98:2.

11. The optical element of claim 9, wherein the solvent is a hydrophobic and non-polar organic solvent.

12. The optical element of claim 1, wherein the undulating structure is formed by a variation in a thickness of a layer of the fluorinated hollow silica particles concentrated toward the first surface.

13. A display device comprising
    a display on which an image is displayed; and
    an optical element disposed on a surface of the display,
    wherein the optical element comprises:
    a substrate; and
    a silica film disposed on the substrate,
    wherein the silica film has a first surface and a second surface, the first and second surfaces being opposite to each other,
    the silica film includes silica and fluorinated hollow silica particles distributed in the silica, the fluorinated hollow silica particles being different from the silica, and the silica being formed by converting a polysilazane to the silica,
    the fluorinated hollow silica particles are unevenly distributed with a greater concentration toward the first surface, and
    the first surface of the silica film has an undulating structure.

14. The display device of claim 13, wherein the silica film further comprises a reactive silicon compound.

15. The display device of claim 13, wherein a region of the silica film where the fluorinated hollow silica particles are concentrated is a low-refractive index layer, and a region other than the region where the fluorinated hollow silica particles are concentrated is a hard coat layer.

16. The display device of claim 13, wherein the fluorinated hollow silica particles are hollow silica particles having a fluorine functional group that is introduced to a part of hydroxyl groups existing on a surface of the hollow silica particles.

17. The display device of claim 16, wherein the fluorinated functional group comprises at least one selected from a (per)fluoro alkyl group and a (per)fluoro polyether group.

18. The display device of claim 13, wherein the fluorinated hollow silica particles have at least two particle diameter distributions which are different from each other.

19. The display device of claim 13, wherein an arithmetic mean roughness (Ra) of the first surface is 10 nm or higher.

20. The display device of claim 13, wherein the undulating structure is formed by a variation in a thickness of a layer of the fluorinated hollow silica particles concentrated toward the first surface.

* * * * *